No. 705,431. Patented July 22, 1902.
J. ORTEIG.
VEHICLE BRAKE.
(Application filed Nov. 7, 1901.)
(No Model.) 2 Sheets—Sheet 1.
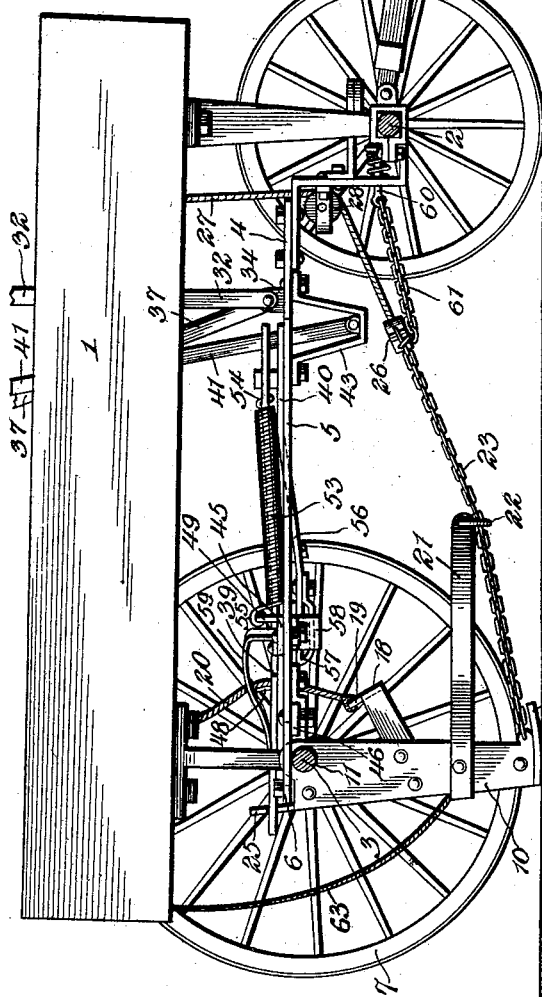
Witnesses
Howard D. Orr.
H. F. Shepard.
Jean Orteig, Inventor:
By E. G. Siggers.
Attorney

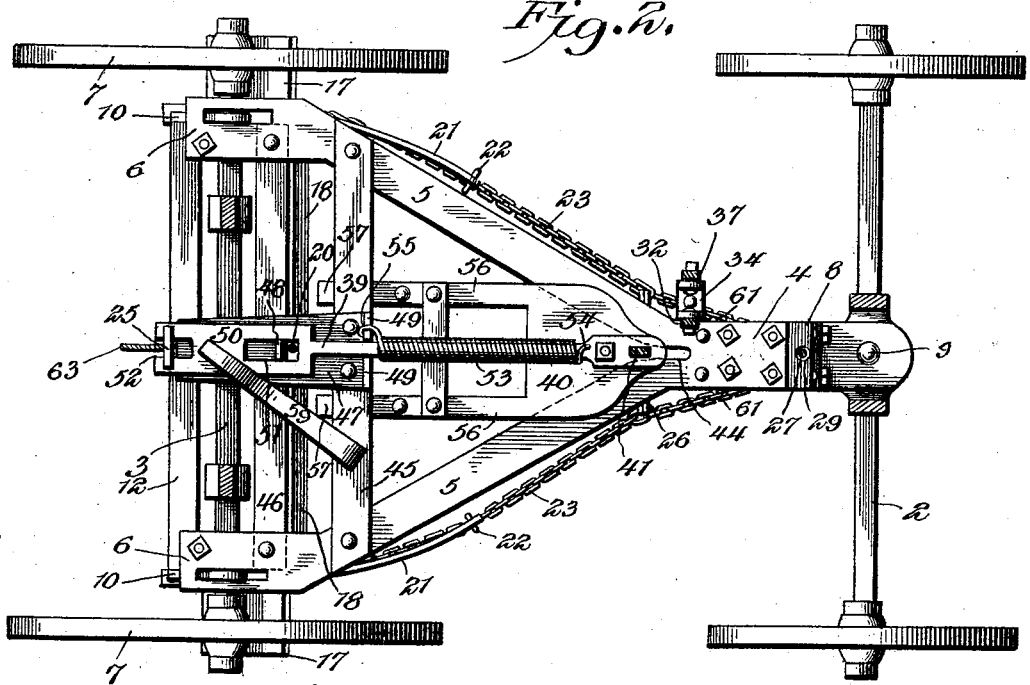

UNITED STATES PATENT OFFICE.

JEAN ORTEIG, OF TEMPE, ARIZONA TERRITORY.

VEHICLE-BRAKE.

SPECIFICATION forming part of Letters Patent No. 705,431, dated July 22, 1902.

Application filed November 7, 1901. Serial No. 81,460. (No model.)

*To all whom it may concern:*

Be it known that I, JEAN ORTEIG, a citizen of the United States, residing at Tempe, in the county of Maricopa and Territory of Arizona, have invented a new and useful Vehicle-Brake, of which the following is a specification.

This invention relates to vehicle-brakes, and has for its object to provide an improved brake mechanism which may be applied to the running-gear of any ordinary vehicle and is arranged for engagement with the ground to raise the wheels of the vehicle out of engagement therewith, so as to check the movement of the vehicle. It is furthermore designed to effectually lock the brake in both its applied and inoperative positions, so as to prevent accidental application of the brake and also to obviate slipping or looseness thereof when applied.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of a vehicle having the present brake mechanism applied thereto and shown in operative position. Fig. 2 is a plan view with the vehicle-body removed. Fig. 3 is a longitudinal sectional view showing the brake in its inoperative position. Fig. 4 is a detail perspective view of the swinging brake-frame. Fig. 5 is a detail plan view showing the arrangement of the brake-levers.

Like characters of reference designate corresponding parts in all the figures of the drawings.

To adequately illustrate the application and operation of the present brake, an ordinary vehicle-body 1 has been shown in the drawings and supported upon the front and rear wheeled axles 2 and 3. It will of course be understood that these parts are common and well known, and therefore may have any preferred form.

In carrying out the present invention there is provided a substantially Y-shaped frame, consisting of a shank portion 4 and the opposite rearwardly-directed members 5, which have substantially parallel terminal portions 6, that are secured across the top of the rear axle adjacent to the hubs of the rear wheels 7, the shank portion of the frame being connected to the front axle by means of a bracket 8, carried by the axle and held thereon by means of a king-bolt 9. Besides forming a support for the locking means of the present invention the Y-shaped frame also forms a reach for connecting the front and rear axles.

Upon the rear axle there is mounted a swinging brake-frame embodying opposite duplicate standards 10, which have their ends provided with corresponding eyes or perforations 11, through which pass the respective spindle portions of the rear axle, so that the standards are mounted to swing in a front and rear direction with respect to the vehicle. These standards are connected by top and bottom cross-bars 12 and 13, which are connected by an intermediate brace-rod 14, and suitable inclined braces 15 extend between the tops of the respective standards and intermediate portion of the lower cross-bar, the latter being furthermore braced by an arch-bar 16, extending between the lower ends of the standards and bearing against the intermediate portion of the said cross-bar. The lower end of each standard 10 is provided with a laterally-projected foot 17, which is normally projected across the rim of the adjacent wheel. A yoke 18 also connects the intermediate portions of the standards 10 and is projected in front thereof and inclined upwardly, the intermediate portion of the yoke being provided with an eye 19 for connection with the rear end of an elevating-cable 20, as will be hereinafter explained. Each standard 10 carries a forwardly-directed arm 21, to the outer end of which is loosely connected a link or ring 22, and a chain 23 has its rear end connected to the lower portion of the standard and its intermediate portion passed loosely through the ring 22 as a guide. To the back of the intermediate portion of the frame there is secured an upright 24, which has a T-shaped head 25 projected above the top of the frame.

For moving the swinging brake-frame from its operative to its inoperative position the opposite chains or cables 23 are connected to the opposite ends of a cross-head 26, to the middle portion of which is connected a cable 27, which passes through a guide-pulley 28, carried by the bracket 8, said cable passing upwardly through an opening 29 in the bracket and also through a slot or opening 30 in the bottom of the vehicle-body, there being a guide-pulley 31 mounted in said slot or opening and located at one side of the center of the vehicle, whereby it is necessary to incline the pulley transversely, as best indicated in Fig. 5, so that the upper end of the cable may be secured to a vertically-disposed lever 32, working through a longitudinal slot 33, formed in the bottom of the wagon, the lower end of the lever being fulcrumed upon a bracket 34, carried by the shank portion of the U-shaped frame. By moving the lever 32 from its forward limit, as shown in Fig. 1, to its rearward limit, as shown in Fig. 3, it will be apparent that the brake-frame may be swung upwardly to an inoperative position through the intermediate connections afforded by the chains 23 and the cable 27.

The foregoing-described elevating means is arranged to give an initial powerful pull upon the brake-frame, so as to start the same from its operative position, and in order that it may be further elevated the cable 20 is brought into use, said cable passing upwardly through a slot or opening 35, formed in the back portion of the vehicle, and over a guide-pulley 36, mounted in said slot, the forward end of the cable being carried forwardly and connected to a lever 37, working in a slot 38, formed in the body of the vehicle and fulcrumed to the bracket 34, so that by throwing the lever 37 forwardly the brake-frame may be elevated to its upper limit.

In order that the frame may be locked in its operative position, as indicated in Figs. 1 and 2 of the drawings, there has been provided a locking-slide comprising upper and lower members 39 and 40, which are mounted upon the main frame 5 and are adapted to slide in a front and rear direction under the action of lever 41, which projects upwardly through a slot 42, formed in the bottom of the vehicle, and is fulcrumed upon a bracket 43, which depends from the shank of the Y-shaped frame, the latter being provided with a slot 44 for the accommodation of the lever and the forward ends of the slide members also being connected to the intermediate portion of the lever. The rear portion of the Y-shaped frame is provided with a cross-bar 45, extending across the upper side of the members 5, and another cross-bar 46, located in rear of the bar 45 and extended across the lower side of the frame. A plate 47 is supported upon these cross-bars and is disposed longitudinally of the vehicle, the intermediate portion of the plate having an upstruck projection 48 and the forward end being provided with upstanding spaced lugs or projections 49. The upper slide member 39 is supported upon this plate and has its rear end laterally enlarged to form a locking-head 50, which is provided with a longitudinal slot 51, receiving the guide projection 48, and the rear end of this locking-head is bifurcated, as indicated at 52, so as to form a fork for the reception of the T-head 25 of the brake-frame, so as to lock the latter in its upright operative position. The reduced shank portion of the slide member 39 works between the guide projections 49, and a helical spring 53 embraces this shank portion and has its forward end connected thereto, as indicated at 54, and its rear end connected to one of the projections 49, as indicated at 55, whereby a spring tension is applied to the slide when it is drawn to its forward limit by the manipulation of the lever 41, so as to draw the locking-head 50 out of engagement with the T-shaped head 25, thereby to release the locking-frame and permit of the same being elevated by the manipulation of the other levers.

The swinging brake-frame is locked in its elevated inoperative position by means of the slide member 40, which has the rearwardly-directed fork members 56, that work beneath the cross-bar 45, and each of these members has its forward end folded upon its under side to form a locking-head 57, which works in a hanger 58, supported from the cross-bar 45. These heads are adapted to slide beneath the yoke 18 of the swinging brake-frame when the latter has been fully elevated, as clearly indicated in Fig. 3 of the drawings, thereby to lock the frame in its inoperative position.

A spring-tongue 59 is carried by the cross-bar 45 and has its free end bearing downwardly upon the head of the slide member 39, so as to prevent accidental displacement thereof.

To prevent violent contact of the swinging brake-frame with the ground when said frame is dropped from its inoperative to its operative position, a spring-actuated bolt or plunger 60 is carried by the bracket 8 upon the front axle of the vehicle, and a chain or other flexible connection 61 extends between the rear end of the bolt and the opposite ends of the cross-head at 26, whereby the fall of the frame is taken up by the plunger.

In the manipulation of the present device, to throw the brake into operation from its inoperative position, as shown in Fig. 3, the locking-lever 41 is moved forwardly and engaged with the notch or keeper 62, provided at the forward end of the slot 44, thereby drawing the locking-heads 57 from beneath the yoke or cross-bar 18 of the swinging frame, whereby the latter is permitted to drop into engagement with the ground, and as the wagon is drawn forwardly the rear wheels are raised from the ground under the action of the standards 10, which are pivoted to the rear axle. The rearward movement of the brake-frame is limited by reason of the T-shaped head 25 striking against the rear end of the plate 47. After the frame has been dropped the lever 41 is released from the notch or keeper 62, whereby said lever and the locking-slide are moved rearwardly under the action of the spring 53, thereby engaging the forked end of the upper slide member with the T-head of the brake-frame, thereby locking the latter against movement upon its pivotal connection with the rear axle.

To release the brake, the locking-lever 41 is moved forwardly and engaged with its keeper. The lever 32 is then swung rearwardly, so as to draw upon the connections 27 and 23, thereby to draw the frame forwardly and out of engagement with the ground, thus lowering the rear wheels into engagement with the ground. After this operation the other lever 37 is then swung rearwardly, so as to further elevate the brake-frame through the medium of the connection 20. When the frame has reached its upper limit by reason of the yoke or cross-bar 18 striking against the under side of the reach-frame, the locking-lever 41 is released, so that it may be drawn rearwardly under the action of the spring 53, and thereby shoot the bolts or locking members 57 beneath the cross-bar 18, and thereby lock or support the brake-frame in its elevated inoperative position.

Should the brake-frame stick or fail to drop quickly, provision has been made to force the frame downwardly, including a rope or cable 63, having one end connected to the staple or eye 64, secured to the lower part of the upright 24 of the frame, the intermediate portion of the cable being projected upwardly through an opening 65 in the back portion of the bottom of the vehicle and over a guide-pulley 66, the forward portion of the rope being extended in reach of the driver and provided with a link or ring 67 to be normally hung upon a hook 68, carried by one side of the vehicle, so as to hold the free end of the rope in convenient reach of the driver.

What I claim is—

1. In a vehicle-brake, the combination with a running-gear, of a vertically-swinging brake-standard carried thereby and having a foot for engagement with the ground, independent controlling-levers having connections, respectively, with the outer free end of the standard and an intermediate point thereof, means for locking the standard in both its operative and inoperative positions, and a controlling-lever for the locking means.

2. In a vehicle-brake, the combination with a running-gear, of a vertically-swinging brake-standard having a foot for engagement with the ground, means for raising and lowering the standard, a locking-head carried by said standard, and a slidable locking-fork to engage the head and lock the standard.

3. In a vehicle-brake, the combination with a running-gear, of a vertically-swinging brake-standard having a foot for engagement with the ground, and also provided at its upper end with a substantially T-shaped locking-head, means for raising and lowering the standard, a spring-actuated locking-slide mounted upon the running-gear and having a fork to engage the T-shaped head, and a controlling device for the locking-slide.

4. In a vehicle-brake, the combination with a running-gear, of opposite vertically-swinging brake-standards having a cross-bar connecting the same and also provided with a foot for engagement with the ground, means for raising and lowering the standards, a slidable locking device mounted upon the running-gear and constructed to engage the cross-bar to hold the standards elevated, and controlling means for the locking-slide.

5. In a vehicle-brake, the combination with a running-gear, of opposite vertically-swinging brake-standards having a cross-bar connecting the same, and also provided with feet for engagement with the ground, means for raising and lowering the standards, a forked spring-actuated locking-slide mounted upon the running-gear and constructed to be slid under the cross-bar and thereby support the standards in an elevated position, and a controlling device for the slide.

6. In a vehicle-brake, the combination with a running-gear, of opposite vertically-swinging brake-standards having a cross-bar connecting the same, and also provided with feet for engagement with the ground, means for raising and lowering the standards, a locking-head carried by the standards, a spring-actuated locking-slide mounted upon the running-gear and constructed for alternate engagement with the locking-head and the cross-bar to lock the standards in their operative and inoperative positions, and means for controlling the locking-slide.

7. In a vehicle-brake, the combination with a running-gear, of opposite swinging standards having feet for engagement with the ground, and also having a cross-bar connecting the same, and a T-shaped locking-head, means for raising and lowering the standards, a spring-actuated locking-slide mounted upon the running-gear and having a rear fork to engage the T-shaped head and lock the standards in their operative positions, and also provided with an intermediate forked portion to engage beneath the cross-bar of the standards and lock the same in an elevated position, and means for controlling the locking-slide.

8. In a vehicle-brake, the combination with a running-gear, of opposite vertically-swinging brake-standards having feet for engagement with the ground, a cross-bar connecting the standards, a T-shaped locking-head carried by the standards, a spring-actuated locking-slide mounted upon the running-gear, and provided with a rear forked end to engage the T-shaped slide and lock the standards in their operative position, and also provided with intermediate fork members to be slid under the cross-bar and lock the standards in an elevated position, and means for controlling the slide.

9. In a vehicle-brake, the combination with a vehicle-body, and the running-gear thereof, of a vertically-swinging brake-frame having feet for engagement with the ground, elevating-levers upon the body, flexible connections between the lower end of the brake-frame and one of the levers, and also between an intermediate portion of the frame and the other lever, slidable means for locking the brake-frame in its operative and inoperative positions, and a lever for controlling said locking means.

10. In a vehicle-brake, the combination with a vehicle-body and the running-gear thereof, of a vertically-swinging brake-frame having feet for engagement with the ground, a pulley mounted upon the forward portion of the running-gear, a corresponding pulley mounted in a slot in the bottom of the vehicle-body, a lever upon the body, a flexible connection extending between the lever and the free portion of the brake-frame, the intermediate portion of the connection being reeved through the pulleys, another lever upon the body, a guide-pulley mounted in a slot in the rear portion of the bottom of the vehicle, a flexible connection between an intermediate portion of the brake-frame and the second-mentioned lever, the intermediate portion of the connection running over the pulley at the rear of the vehicle, spring-actuated means for locking the brake-frame in its operative and inoperative positions, a controlling-lever for the locking means, and means for holding the lever at one limit to support the locking means out of engagement with the brake-frame.

11. In a vehicle-brake, the combination with a wagon-body, and the running-gear thereof, of a brake-frame swung from the rear axle and comprising opposite standards having lower terminal feet for engagement with the ground, cross-bars connecting the standards, a yoke-shaped cross-bar projecting in front of the standards, arms extended forwardly from each standard and having outer terminal guide-eyes, a T-shaped locking-head projected above the frame, a pair of elevating-levers fulcrumed upon the running-gear and working in corresponding slots in the bottom of the vehicle-body, corresponding guide-pulleys carried by the running-gear and in a slot in the bottom of the body, a flexible connection extending from one of the levers and reeved through the pulleys, and opposite flexible connections extending from the free ends of the respective standards through the guide-eyes at the outer ends of the arms thereof and connected to the first-mentioned flexible connection, a guide-pulley mounted in the slot in the rear portion of the bottom of the body, a flexible connection between the yoke-shaped cross-bar of the brake-frame and the other lever, the intermediate portion of the connection being reeved through the last-mentioned pulley, a locking-slide mounted upon the running-gear and comprising upper and lower members, the upper member having a forked rear end to engage the T-shaped locking-head of the brake-frame, a coiled spring embracing said upper member and connected at the opposite ends to the member and a portion of the running-gear, the lower member having a fork, the members of which are constructed to engage the under side of the yoke-shaped cross-bar of the brake-frame and support the same in an elevated position, and a lever fulcrumed upon the running-gear, working in a slot in the bottom of the vehicle and also connected to the locking-slide.

12. In a brake, the combination with the running-gear of a vehicle, of a vertically-swinging brake-standard mounted thereon and provided at its free end with a foot for engagement with the ground, means for supporting the standard in an inoperative position, means connected to the free end of the brake-standard for elevating the same, a guide located in rear of the brake-standard, and a rope or cable having one end connected to the brake-standard, its opposite end located in reach of the driver of the vehicle, and the intermediate portion of the rope or cable working through the guide to draw the standard downwardly and engage the foot with the ground.

In testimony that I claim the foregoing as my own I have hereto affixed my signature in the presence of two witnesses.

JEAN ORTEIG.

Witnesses:
CHAS. WOOLF,
EDWARD B. GOODWIN.